US010074844B2

(12) United States Patent
Wada et al.

(10) Patent No.: US 10,074,844 B2
(45) Date of Patent: Sep. 11, 2018

(54) BATTERY MODULE (71) Applicant: HONDA MOTOR CO., LTD., Tokyo (JP)

(72) Inventors: Shinji Wada, Wako (JP); Arihisa Kimura, Wako (JP); Koichi Yamamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 529 days.

(21) Appl. No.: 14/362,670

(22) PCT Filed: Dec. 5, 2012

(86) PCT No.: PCT/JP2012/081511
§ 371 (c)(1),
(2) Date: Jun. 4, 2014

(87) PCT Pub. No.: WO2013/084941
PCT Pub. Date: Jun. 13, 2013

(65) Prior Publication Data
US 2014/0335393 A1 Nov. 13, 2014

(30) Foreign Application Priority Data
Dec. 9, 2011 (JP) .................................. 2011-269838

(51) Int. Cl.
*H01M 2/20* (2006.01)
*H01M 2/10* (2006.01)
(Continued)

(52) U.S. Cl.
CPC ........... *H01M 2/206* (2013.01); *B60L 3/0046* (2013.01); *B60L 11/1864* (2013.01);
(Continued)

(58) Field of Classification Search
None
See application file for complete search history.

(56) References Cited

U.S. PATENT DOCUMENTS

| 6,261,719 B1 | 7/2001 | Ikeda et al. |
| 2005/0250006 A1 | 11/2005 | Kim |

(Continued)

FOREIGN PATENT DOCUMENTS

| JP | 2000-149909 A | 5/2000 |
| JP | 2005-322647 A | 11/2005 |

(Continued)

OTHER PUBLICATIONS

International Search Report dated Feb. 26, 2013, issued in corresponding application No. PCT/JP2012/081511.

*Primary Examiner* — Barbara Lee Gilliam
*Assistant Examiner* — Adam A Arciero
(74) *Attorney, Agent, or Firm* — Westerman, Hattori, Daniels & Adrian, LLP (57) ABSTRACT

To connect a bus bar plate to a battery module, a plurality of recess portions provided on a plurality of holders so as to be spaced in the stacking direction are engaged with a plurality of projection portions provided on the bus bar plate to be spaced in the stacking direction. Since the lengths "a" of the plurality of projection portions are the same, and the plurality of recess portions are formed from a first recess portion having a length "a" and a second recess portion having a length "b" larger than the length "a," the precision of positioning of the bus bar plate can be ensured by engagement between the projecting portion and the first recess portion, and even if the gap between the projecting portions or the recess portions is nonuniform, it is possible to assemble the bus bar plate onto the holder with high precision.

6 Claims, 4 Drawing Sheets

(51) Int. Cl.
  *B60L 11/18*    (2006.01)
  *B60L 3/00*    (2006.01)
(52) U.S. Cl.
  CPC ....... *B60L 11/1879* (2013.01); *H01M 2/1077* (2013.01); *H01M 2220/20* (2013.01); *Y02T 10/7005* (2013.01); *Y02T 10/7061* (2013.01)

(56)    References Cited

U.S. PATENT DOCUMENTS

| | | |
|---|---|---|
| 2009/0053591 A1 | 2/2009 | Ikeda et al. |
| 2011/0287299 A1 | 11/2011 | Kim |
| 2012/0009447 A1 | 1/2012 | Ikeda et al. |

FOREIGN PATENT DOCUMENTS

| | | |
|---|---|---|
| JP | 2009-43637 A | 2/2009 |
| JP | 2009-48973 A | 3/2009 |
| JP | 2009-87646 A | 4/2009 |
| JP | 2011-228218 A | 11/2011 |
| JP | 2011-249303 A | 12/2011 |
| WO | 2011142201 A1 | 11/2011 |

BATTERY MODULE

TECHNICAL FIELD

The present invention relates to a battery module that includes a plurality of battery cells stacked with holders held therebetween, and a bus bar plate having a plurality of bus bars providing electrical connection between terminals of the plurality of battery cells, the plurality of holders and the bus bar plate being joined by engagement between a plurality of projecting portions provided on one of the bus bar plate and the plurality of holders so as to be spaced in the stacking direction and a plurality of recess portions provided on the other of the bus bar plate and the plurality of holders so as to be spaced in the stacking direction.

BACKGROUND ART

An arrangement in which, in order to electrically connect a positive electrode and a negative electrode of each battery of a battery assembly having a plurality of batteries and a plurality of interbattery plates alternatingly superimposed, a positioning boss provided on the interbattery plate is fitted into a positioning hole formed in a bus bar plate having a plurality of bus bars to thus position the bus bar plate with respect to the interbattery plate, ease of assembly of the bus bar plate onto the interbattery plate being enhanced by making the diameter of the positioning hole larger than the diameter of the positioning boss, is known from Patent Document 1 below.

RELATED ART DOCUMENTS

Patent Document

Patent Document 1: Japanese Patent Application Laid-open No. 2009-87646

SUMMARY OF THE INVENTION

Problems to be Solved by the Invention

In the above conventional arrangement, a positioning boss is fitted into a positioning hole at two positions at one end in the longitudinal direction of the bus bar plate, but in order to enhance the precision of positioning of the bus bar plate with respect to the interbattery plate, it is necessary to provide a larger number of positioning holes and positioning bosses. However, since the thickness of individual batteries and the thickness of individual interbattery plates have errors, the errors might accumulate when stacking the plurality of batteries and the plurality of interbattery plates, thus making it difficult to fit the positioning boss into the positioning hole.

The present invention has been accomplished in light of the above circumstances, and it is an object thereof to achieve a balance between ease of assembly and precision of assembly when a holder and a bus bar plate are joined by engagement between a plurality of projecting portions and a plurality of recess portions.

Means for Solving the Problems

In order to attain the above object, according to a first aspect of the present invention, there is provided a battery module comprising a plurality of battery cells stacked with holders held therebetween, and a bus bar plate having a plurality of bus bars providing electrical connection between terminals of the plurality of battery cells, the plurality of holders and the bus bar plate being joined by engagement between a plurality of projecting portions provided on one of the bus bar plate and the plurality of holders so as to be spaced in the stacking direction and a plurality of recess portions provided on the other of the bus bar plate and the plurality of holders so as to be spaced in the stacking direction, wherein a length in the stacking direction of the plurality of projecting portions is the same, and the plurality of recess portions comprise a first recess portion and a second recess portion having a length in the stacking direction that is larger than that of the first recess portion.

Further, according to a second aspect of the present invention, in addition to the first aspect, the first recess portion is positioned in a middle part in the stacking direction, and the second recess portions are positioned in opposite end parts in the stacking direction.

Furthermore, according to a third aspect of the present invention, in addition to the second aspect, the further from the first recess portion, the larger the length in the stacking direction of the second recess portion.

Moreover, according to a fourth aspect of the present invention, there is provided a battery module comprising a plurality of battery cells stacked with holders held therebetween, and a bus bar plate having a plurality of bus bars providing electrical connection between terminals of the plurality of battery cells, the plurality of holders and the bus bar plate being joined by engagement between a plurality of projecting portions provided on one of the bus bar plate and the plurality of holders so as to be spaced in the stacking direction and a plurality of recess portions provided on the other of the bus bar plate and the plurality of holders so as to be spaced in the stacking direction, wherein a length in the stacking direction of the plurality of recess portions is the same, and the plurality of projecting portions comprise a first projecting portion and a second projecting portion having a length in the stacking direction that is smaller than that of the first projecting portion.

Further, according to a fifth aspect of the present invention, in addition to the fourth aspect, the first projecting portion is positioned in a middle part in the stacking direction, and the second projecting portions are positioned in opposite end parts in the stacking direction.

Furthermore, according to a sixth aspect of the present invention, in addition to the fifth aspect, the further from the first projecting portion, the smaller the length in the stacking direction of the second projecting portion.

A positive terminal 12a and a negative terminal 12b of an embodiment correspond to the terminal of the present invention, a first holder 13 of the embodiment corresponds to the holder of the present invention, and a first bus bar 16 and a second bus bar 17 of the embodiment correspond to the bus bar of the present invention.

EFFECTS OF THE INVENTION

In accordance with the first aspect of the present invention, in order to electrically connect the terminals of the plurality of battery cells, which are stacked with the plurality of holders held therebetween, by means of the plurality of bus bars, the bus bar plate having the bus bars provided thereon is joined to the holder. In this arrangement, the plurality of projecting portions provided on one of the bus bar plate and the plurality of holders so as to be spaced in the stacking direction are engaged with the plurality of recess portions provided on the other of the bus bar plate and the plurality of holders so as to be spaced in the stacking direction; since the lengths in the stacking direction of the plurality of projecting portions are the same and the plurality of recess portions include the first recess portion and the second recess portion having a larger length in the stacking direction than that of the first recess portion, the precision of positioning of the bus bar plate can be ensured by engagement between the projecting portion and the first recess portion, and even if the gap between the projecting portions or the recess portions is nonuniform due to variation in thickness of the battery cell and the holder, it is also possible, by absorbing the error by means of the dimensional error between the projecting portion and the second recess portion, to assemble the bus bar plate onto the holder simply and with high precision.

Furthermore, in accordance with the second aspect of the present invention, since the first recess portion is positioned in the middle part in the stacking direction and the second recess portions are positioned in opposite end parts in the stacking direction, it is possible to disperse the cumulative amount of variation in thickness of the battery cells and the holders in two directions, thus reducing the length of the second recess portion.

Moreover, in accordance with the third aspect of the present invention, since the further the second recess portion is from the first recess portion the larger the length in the stacking direction is, it is possible, by increasing the length of the second recess portion according to the increase in the cumulative amount of variation in thickness of the battery cell and the holder, to minimize the length of the second recess portion as much as possible.

Furthermore, in accordance with the fourth aspect of the present invention, in order to electrically connect the terminals of the plurality of battery cells, which are stacked with the plurality of holders held therebetween, by means of the plurality of bus bars, the bus bar plate having provided thereon the bus bars is joined to the holder. In this arrangement, the plurality of projecting portions provided on one of the bus bar plate and the plurality of holders so as to be spaced in the stacking direction are engaged with the plurality of recess portions provided on the other of the bus bar plate and the plurality of holders so as to be spaced in the stacking direction; since the lengths in the stacking direction of the plurality of recess portions are the same and the plurality of projecting portions include the first projecting portion and the second projecting portion having a smaller length in the stacking direction than that of the first projecting portion, the precision of positioning of the bus bar plate can be ensured by engagement between the recess portion and the first projecting portion, and even if the gap between the projecting portions or the recess portions is nonuniform due to variation in thickness of the battery cell and the holder, it is also possible, by absorbing the error by means of the dimensional variation between the recess portion and the second projecting portion, to assemble the bus bar plate onto the holder simply and with high precision.

Moreover, in accordance with the fifth aspect of the present invention, since the first projecting portion is positioned in the middle part in the stacking direction and the second projecting portions are positioned in opposite end parts in the stacking direction, it is possible to disperse the cumulative amount of variation in thickness of the battery cell and the holder in two directions, thus reducing the length of the recess portion.

Furthermore, in accordance with the sixth aspect of the present invention, since the further the second projecting portion is from the first projecting portion the smaller the length in the stacking direction is, it is possible, by reducing the length of the second projecting portion according to the increase in the cumulative amount of variation in thickness of the battery cell and the holder, to minimize the length of the second recess portion as much as possible.

EXPLANATION OF REFERENCE NUMERALS AND SYMBOLS

12 Battery cell
12a Positive terminal (terminal)
12b Negative terminal (terminal)
13 First holder (holder)
13c Recess portion
13c(a) First recess portion
13c(b) Second recess portion
16 First bus bar (bus bar)
17 Second bus bar (bus bar)
15 Bus bar plate
15e Projecting portion
15e(a) First projecting portion
13e(b) Second projecting portion

MODES FOR CARRYING OUT THE INVENTION

A first embodiment of the present invention is explained below by reference to FIG. 1 to FIG. 3.

First Embodiment

Figure 1:
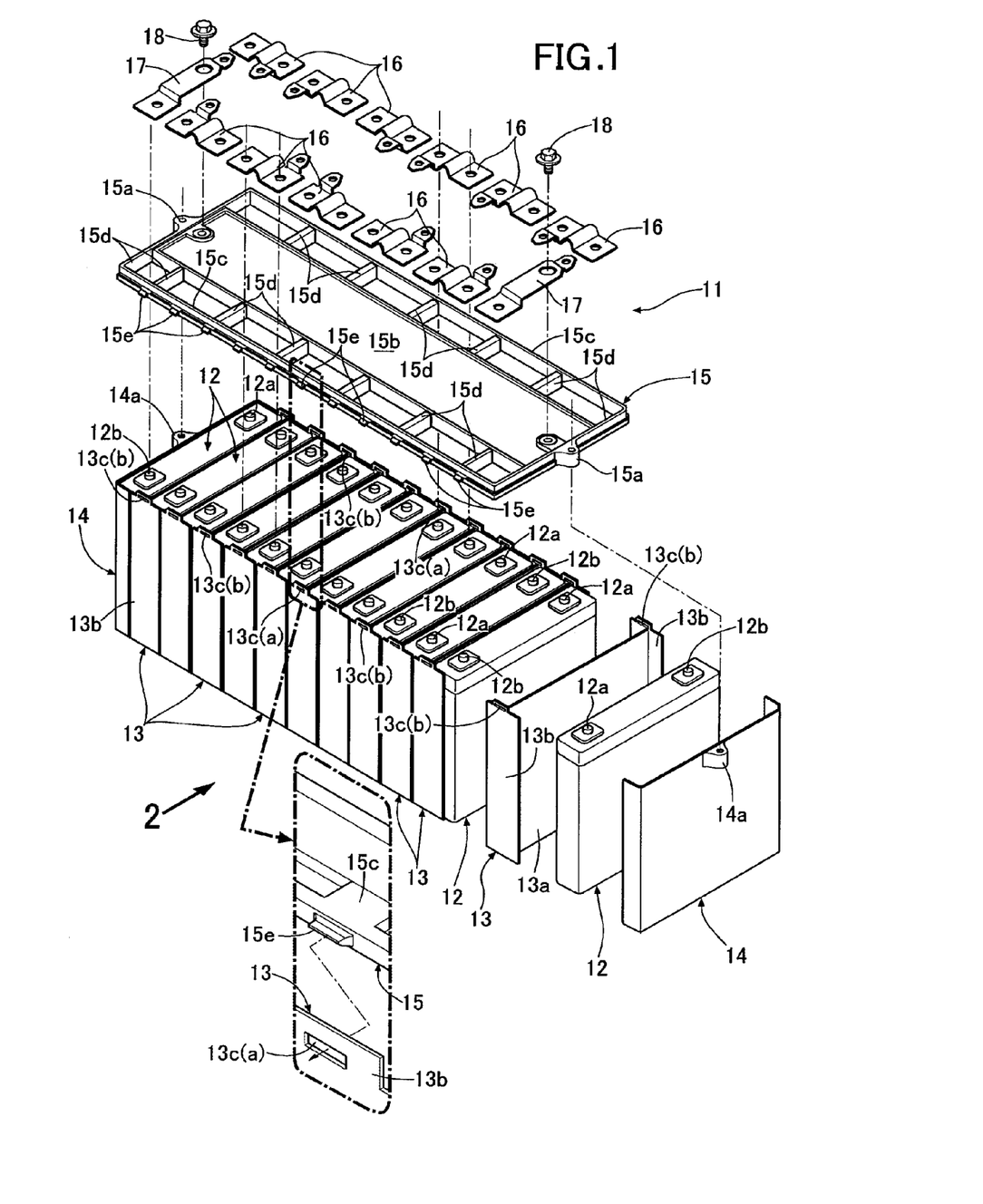
FIG. 1 is an exploded perspective view of a battery module. (first embodiment)

As shown in FIG. 1, a battery module 11 used in an electric automobile is formed by stacking a plurality (twelve in the embodiment) of rectangular parallelepiped battery cells 12 with first holders 13 made of a synthetic resin so as to have an H-shaped cross section held therebetween, stacking, on the outer side in the stacking direction of two battery cells 12 and 12 positioned at opposite ends in the stacking direction, two second holders 14 and 14 made of a synthetic resin so as to have a squared U-shaped cross section, and fastening them by fastening means, which is not illustrated. Each battery cell 12 is positioned so as to be sandwiched by the first holder 13 or the second holder 14 positioned on opposite sides thereof, and the shape of the battery module 11 is maintained by the first holders 13 and the second holders 14 and 14 meshing with each other so as to have a fixed positional relationship.

A positive terminal 12a and a negative terminal 12b are provided on an upper face of each battery cell 12, the positive terminals 12a and negative terminals 12b of the twelve battery cells 12 being electrically connected in series via a bus bar plate 15. That is, the bus bar plate 15 is a member that is formed into a flat frame shape using a synthetic resin, and is provided with eleven first bus bars 16 made of a metal plate and two second bus bars 17 and 17 made of a metal plate. The twelve battery cells 12 are stacked such that the positive terminals 12a and the negative terminals 12b alternatingly face in opposite directions; each first bus bar 16 connects the positive terminal 12a to the negative terminal 12b adjacent thereto in the stacking direction of two adjacent battery cells 12 and 12, and the two second bus bars 17 and 17 are connected to the positive terminal 12a of the battery cell 12 positioned at one end in the stacking direction and the negative terminal 12b of the battery cell 12 positioned at the other end in the stacking direction.

A pair of boss portions 15a and 15a are provided on opposite end parts in the longitudinal direction of the bus bar plate 15, and two bolts 18 and 18 extending through these boss portions 15a and 15a are screwed into boss portions 14a and 14a provided on the pair of second holders 14 and 14, thus assembling the bus bar plate 15 onto the battery module 11.

The bus bar plate 15 includes a main body portion 15b extending in the longitudinal direction (stacking direction) in its middle part, two longitudinal frames 15c and 15c extending in parallel to each other on left and right sides of the main body portion 15b, and a total of sixteen lateral frames 15d that link the main body portion 15b and the longitudinal frames 15c and 15c. The first bus bars 16 and the second bus bars 17 and 17 are secured in spaces bounded by the main body portion 15b, the longitudinal frames 15c and 15c, and the lateral frames 15d. Eleven projecting portions 15e are projectingly provided on an outer face of each longitudinal frame 15c, the projecting portions 15e being spaced at a fixed distance in the stacking direction. On the other hand, each first holder 13 includes a main body portion 13a sandwiched between adjacent battery cells 12 and 12, and a pair of flange portions 13b and 13b protruding in the stacking direction from opposite ends of the main body portion 13a. A recess portion 13c is formed in an upper part of each flange portion 13b.

Figure 2:
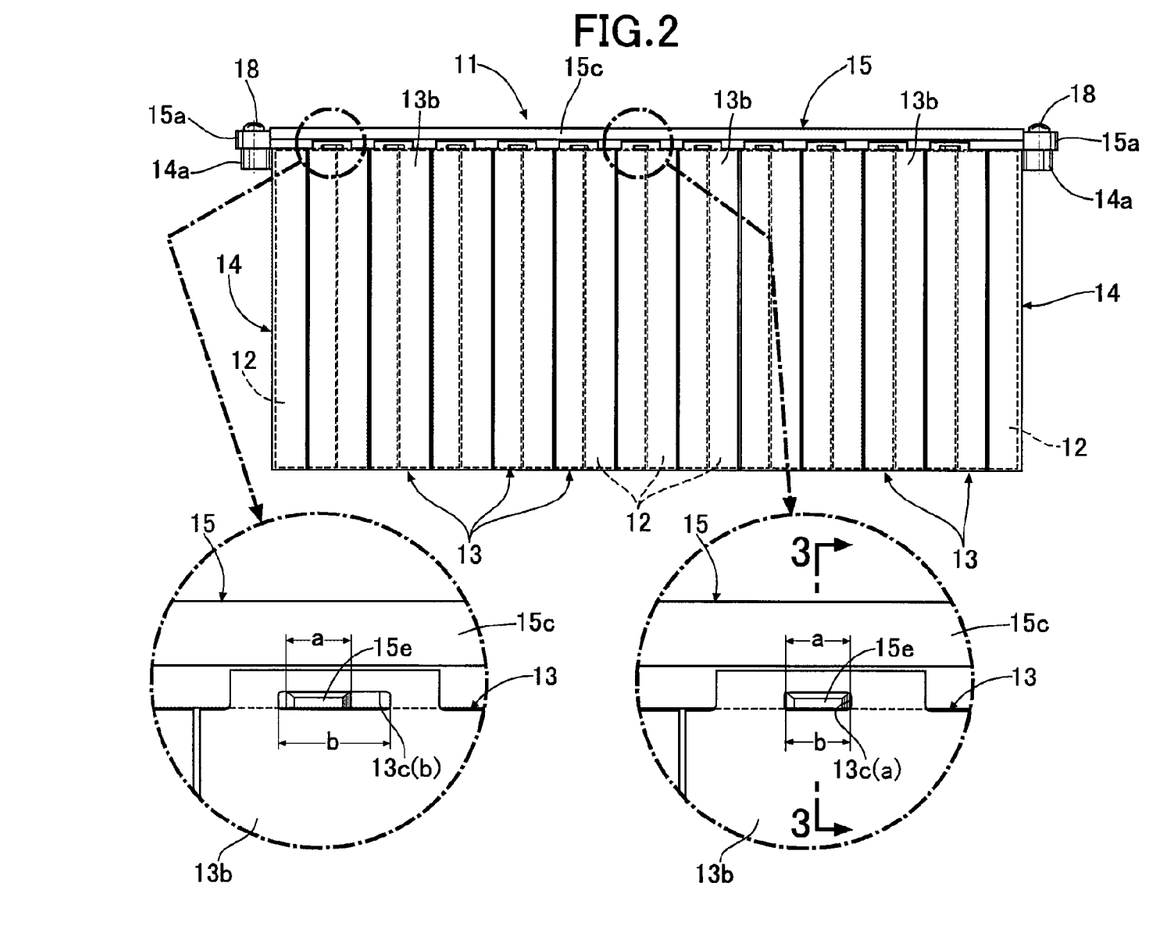
FIG. 2 is a view in the direction of arrow 2 in FIG. 1. (first embodiment)
Figure 3:
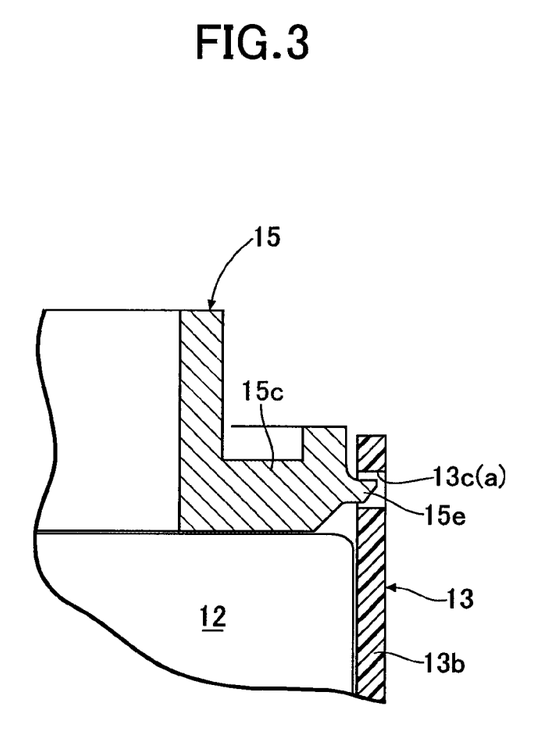
FIG. 3 is a sectional view along line 3-3 in FIG. 2. (first embodiment)

As shown in FIG. 2, the shapes of the eleven projecting portions 15e, which are provided at fixed intervals on the longitudinal frame 15c on one side of the bus bar plate 15, are all the same and of a rectangular shape having a length a in the stacking direction. On the other hand, the recess portions 13c, of which there are eleven on one side, provided on the flange portions 13b of the eleven first holders 13 all have a rectangular shape that is long in the stacking direction but lengths b thereof in the stacking direction are different. That is, among the eleven recess portions 13c, the length b for one recess portion 13c positioned in the middle in the stacking direction (hereinafter, called a first recess portion 13c(a)) is the smallest and is a length into which the projecting portion 15e fits without a gap (that is, the length a). The further that one of the five recess portions 13c positioned on either side in the stacking direction of the first recess portion 13c(a) (hereinafter, called second recess portions 13c(b)) is from the first recess portion 13c(a), the larger the length b thereof is.

The operation of the first embodiment of the present invention having the above arrangement is now explained.

The bus bar plate 15 is assembled onto the upper face of the battery module 11, in which the twelve battery cells 12, the eleven first holders 13, and the two second holders 14 and 14 are stacked, and it is thus possible to connect the positive terminals 12a and the negative terminals 12b of the battery cells 12 all at once by means of the first bus bars 16 and the second bus bars 17 and 17 provided on the bus bar plate 15.

In order to assemble the bus bar plate 15 onto the battery module 11, the eleven projecting portions 15e projectingly provided on each of the pair of left and right longitudinal frames 15c and 15c of the bus bar plate 15 are simply engaged with the corresponding eleven recess portions 13c formed on each of the pair of left and right flange portions 13b and 13b of the eleven first holders 13, and the two bolts 18 and 18 extending through the boss portions 15a and 15a provided at opposite ends of the main body portion 15b of the bus bar plate 15 are simply screwed into the boss portions 14a and 14a provided on the two second holders 14 and 14.

With regard to the thickness in the stacking direction of the battery cells 12 and the first holders 13, the occurrence of production errors cannot be avoided, and there is also a case in which the battery cells 12 expand due to temperature change and errors occur in thickness. Even though these individual errors may be small, if the errors accumulate when the plurality of battery cells 12 and the plurality of first holders 13 are stacked, the positions of the projecting portions 15e of the bus bar plate 15 and the positions of the recess portions 13c of the first holders 13 are displaced, and there is a possibility that assembly of the bus bar plate 15 will not be able to be carried out smoothly. In order to avoid this, the length of the recess portions 13c may be made larger than the length of the projecting portions 15e, but this generates play between all of the projecting portions 15e and all of the recess portions 13c, thus causing a possibility that the bus bar plate 15 will not be able to be positioned relative to the battery module 11 with good precision.

However, in accordance with the present embodiment, since the width a of the first recess portions 13c(a) and 13c(a) of the first holder 13 positioned in the middle in the stacking direction coincides with the width a of the projecting portions 15e and 15e of the bus bar plate 15 positioned in the middle in the stacking direction, it is possible, by engagement thereof, to position the bus bar plate 15 relative to the battery module 11 in the stacking direction with good precision.

Furthermore, other than the first holder 13 positioned in the middle in the stacking direction, the positions of the first holders 13 on opposite sides vary in the stacking direction due to the dimensional errors, and the further from the first holder 13 in the middle the larger the amount of variation is. However, in accordance with the present embodiment, since the width b in the stacking direction is set so that the further from the middle in the stacking direction the second recess portions 13c(b) of the first holders 13 are the larger it is, it is possible, while minimizing the dimensions of the second recess portions 13c(b) as much as possible, to avoid a situation where the projecting portions 15e and the second recess portions 13c(b) cannot engage with each other.

Although it is exaggerated in FIG. 2, the difference between the length a of the first recess portion 13c(a) in the middle and the length b of the second recess portion 13c(b) on the outside, which is the longest, is on the order of 1.5 mm.

In the first embodiment above, the first recess portion 13c(a) is disposed in the middle in the longitudinal direction of the bus bar plate 15, but the first recess portion 13c(a) may be disposed at any position, including an end part in the longitudinal direction of the bus bar plate 15. Even in this case, it is possible to absorb the dimensional errors of the battery cells 12 or the first holders 13 while ensuring the precision of positioning of the bus bar plate 15 relative to the battery module 11.

When the first recess portion 13(a) of the first holder 13 is provided at one end of the bus bar plate 15, the positional error with respect to the projecting portion 15e at the other end of the bus bar plate 15 becomes twice that of the first embodiment, and it is therefore necessary to set the length b of the second recess portion 13c(b) larger by a corresponding amount. Specifically, the difference between the length a of the first recess portion 13c(a) at one end and the length b of the second recess portion 13c(b) at the other end, which is the largest, becomes 3.0 mm, which is twice that of the first embodiment. On the other hand, in accordance with the first embodiment, due to the first recess portion 13(a) of the first holder 13 being provided in the middle of the bus bar plate 15, the cumulative error can be dispersed in two directions, thereby minimizing the length b of the second recess portion 13c(b).

Figure 4:
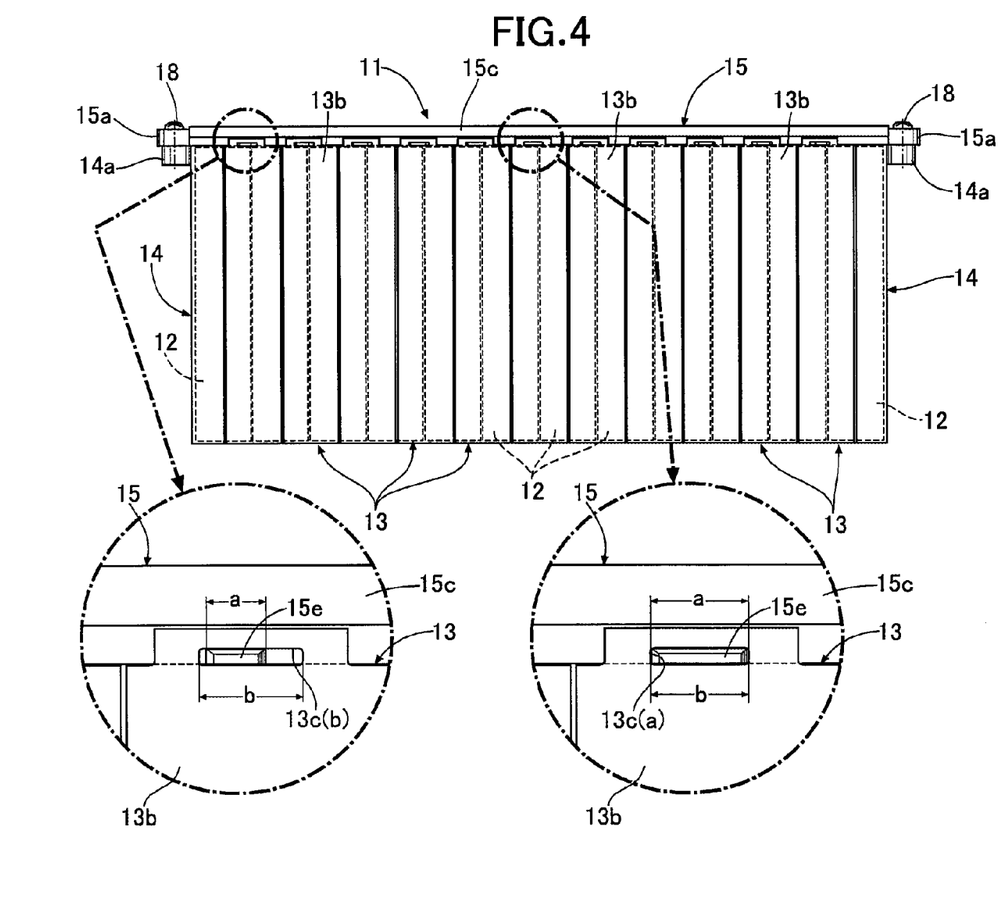
FIG. 4 is a view corresponding to FIG. 2. (second embodiment)

A second embodiment of the present invention is now explained by reference to FIG. 4.

Second Embodiment

In the first embodiment, the length of the projecting portions 15e of the bus bar plate 15 is fixed, and the length of the recess portions 13c of the first holders 13 is varied, but in the second embodiment the length of recess portions 13c of first holders 13 is fixed, and the length of projecting portions 15e of a bus bar plate 15 is varied.

That is, lengths b of the recess portions 13c of the first holders 13 are all the same, and a length a of a first projecting portion 15e(a) in the middle of the bus bar plate 15 is b, which is the same as the length b of the recess portions 13c, but the further second projecting portions 15e(b) on opposite end sides of the bus bar plate 15 are from the first projecting portion 15e(a) in the middle, the smaller the lengths a thereof are.

In accordance with this second embodiment also, it is possible to absorb dimensional errors of the battery cells 12 and the first holders 13 by the difference in dimensions between the recess portions 13c and the second projecting portions 15e(b) on the outer side while positioning the bus bar plate 15 in the longitudinal direction by engagement of the first projecting portion 15e(a) in the middle with the recess portion 13c. Moreover, since the first projecting portion 15e(a) is disposed in the middle in the longitudinal direction of the bus bar plate 15, even when the length a of the first projecting portion 15e(a) in the middle, which is the largest, is set small, it is possible to ensure a sufficient length a of the second projecting portions 15e(b) in the end parts, which are the smallest, thereby suppressing the length b of the recess portions 13c.

Embodiments of the present invention are explained above, but the present invention may be modified in a variety of ways as long as the modifications do not depart from the spirit and scope thereof.

For example, in the embodiments the projecting portions 15e are provided in the bus bar plate 15 and the recess portions 13c are provided in the first holders 13, but a recess portion may be provided in a bus bar plate 15 and a projecting portion may be provided in a first holders 13.

Furthermore, the recess portions 13c of the embodiments are formed from a hole extending through the flange portions 13b of the first holders 13, but the recess portions 13c may be formed from indentations.

Moreover, in the first embodiment since an odd number (eleven) of projecting portions 15e are provided on one side of the bus bar plate 15, the projecting portion 15e that is sixth from the end part becomes the projecting portion 15e in the middle, and a recess portion 13c that engages with this projecting portion 15e becomes the first recess portion 13c(a). However, when an even number of projecting portions 15e are provided on one side of the bus bar plate 15, since there are two projecting portions 15e and 15e in the middle, two recess portions 13c and 13c may be first recess portions 13c(a) and 13c(a) that engage with the two projecting portions 15e and 15e. In the second embodiment also, the same applies except that the projecting portion 15e and the recess portion 13c are interchanged.

Furthermore, in the first embodiment the length b of the second recess portions 13c(b) is set so that the further from the middle of the bus bar plate 15 it is, the larger it is, but the lengths b of the second recess portions 13c(b) may be all the same as long as they are larger than the length a of the first recess portion 13c(a). In the second embodiment also, the same applies except that the projecting portion 15e and the recess portion 13c are interchanged.

The invention claimed is:

1. A battery module comprising:
a plurality of battery cells stacked in a stacking direction;
a plurality of holders each held between adjacent two of the battery cells; and
a bus bar plate having a plurality of bus bars providing electrical connection between terminals of the plurality of battery cells, the bus bar plate being placed on upper surfaces of the battery cells, the plurality of holders and the bus bar plate being joined by engagement between a plurality of projecting portions provided on one of the bus bar plate and the plurality of holders so as to be spaced in the stacking direction and a plurality of recess portions provided on the other of the bus bar plate and the plurality of holders so as to be spaced in the stacking direction, wherein
each of the holders comprises a main body portion held between the adjacent two battery cells and a flange portion protruding from the main body portion in the stacking direction, the flange portions having extensions which extend upwardly of the upper surfaces of the battery cells,
the projecting portions extend substantially parallel to the upper surfaces of the battery cells, and the engagement between the projecting portions and the recess portions is made in a direction substantially parallel to the upper surfaces of the battery cells,
a length in the stacking direction of the plurality of projecting portions is the same, and
the plurality of recess portions comprise a first recess portion and second recess portions, and each of the second recess portions have a length in the stacking direction that is larger than that of the first recess portion.

2. The battery module according to claim 1, wherein the first recess portion is positioned in a middle part of the battery module in the stacking direction of the battery cells, and the second recess portions are positioned in opposite end parts in the stacking direction.

3. The battery module according to claim 2, wherein the further from the first recess portion, the larger the length in the stacking direction of the second recess portion.

4. A battery module comprising:
a plurality of battery cells stacked in a stacking direction;
a plurality of holders each held between adjacent two of the battery cells; and
a bus bar plate having a plurality of bus bars providing electrical connection between terminals of the plurality of battery cells, the bus bar plate being placed on upper surfaces of the battery cells, the plurality of holders and the bus bar plate being joined by engagement between a plurality of projecting portions provided on one of the bus bar plate and the plurality of holders so as to be spaced in the stacking direction and a plurality of recess portions provided on the other of the bus bar plate and the plurality of holders so as to be spaced in the stacking direction, wherein each of the holders comprises a main body portion held between the adjacent two battery cells and a flange portion protruding from the main body portion in the stacking direction, the flange portion having extensions which extend upwardly of the upper surfaces of the battery cells, the projecting portions extend substantially parallel to the upper surfaces of the battery cells, and the engagement between the projecting portions and the recess portions is made in a direction substantially parallel to the upper surfaces of the battery cells, a length in the stacking direction of the plurality of recess portions is the same, and the plurality of projecting portions comprise a first projecting portion and second projecting portions, and each of the second projecting portions has a length in the stacking direction that is smaller than that of the first projecting portion.

5. The battery module according to claim 4, wherein the first projecting portion is positioned in a middle part of the battery module in the stacking direction of the battery cells, and the second projecting portions are positioned in opposite end parts in the stacking direction.

6. The battery module according to claim 5, wherein the further from the first projecting portion, the smaller the length in the stacking direction of the second projecting portion.

* * * * *